(12) United States Patent
Khojastepour et al.

(10) Patent No.: US 8,891,604 B2
(45) Date of Patent: Nov. 18, 2014

(54) COORDINATED MULTI-POINT TRANSMISSION

(71) Applicant: NEC Laboratories America, Inc., Princeton, NJ (US)

(72) Inventors: Mohammad A. Khojastepour, Lawrenceville, NJ (US); Xinyu Zhang, Madison, WI (US); Karthikeyan Sundaresan, Howell, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 104 days.

(21) Appl. No.: 13/629,034

(22) Filed: Sep. 27, 2012

(65) Prior Publication Data

US 2013/0170533 A1     Jul. 4, 2013

Related U.S. Application Data

(60) Provisional application No. 61/540,184, filed on Sep. 28, 2011.

(51) Int. Cl.
| | |
|---|---|
| *H04B 3/46* | (2006.01) |
| *H04B 17/00* | (2006.01) |
| *H04Q 1/20* | (2006.01) |
| *H04B 7/04* | (2006.01) |
| *H04B 7/02* | (2006.01) |

(52) U.S. Cl.
CPC .............. *H04B 7/0456* (2013.01); *H04B 7/024* (2013.01)
USPC ........................................... 375/227; 370/328

(58) Field of Classification Search
CPC ...... H04L 5/20; H04L 5/0032; H04B 7/0452; H04B 7/0626

USPC .......................................... 375/227; 370/328
See application file for complete search history.

(56) References Cited

U.S. PATENT DOCUMENTS

| | | | |
|---|---|---|---|
| 8,498,193 B2* | 7/2013 | Haardt et al. ................. | 370/203 |
| 2007/0183362 A1* | 8/2007 | Mondal et al. ................ | 370/329 |

(Continued)

OTHER PUBLICATIONS

Sawahashi, M. and Kishiyama, Y. and Morimoto, A. and Nishikawa, D. and Tanno, M., "Coordinated Multipoint Transmission/Reception Techniques for LTE-Advanced [Coordinated and Distributed MIMO]," IEEE Wireless Communications, vol. 17, No. 3, 2010.

(Continued)

*Primary Examiner* — Sam K Ahn
*Assistant Examiner* — Fabricio R Murillo Garcia
(74) *Attorney, Agent, or Firm* — Joseph Kolodka

(57) ABSTRACT

In a multiple-input multiple-output (MIMO) wireless system supporting Coordinated Multi-Point (CoMP) transmission and having a first base station, a second base station, and a user equipment, a communications method implemented in the first base station is disclosed. In an aspect, the communications method includes exchanging, with the second base station through local information exchange, first information about a first channel between the first base station and the user equipment and second information about a second channel between the second base station and the user equipment, and computing at least one of a precoding matrix, a receiver filter, and a projection matrix, wherein the user equipment estimates the first information and the second information, and shares the first information and the second information with the first base station. Other apparatuses and some methods for wireless communications also are disclosed.

20 Claims, 12 Drawing Sheets

(56) References Cited

U.S. PATENT DOCUMENTS

2009/0323848 A1* 12/2009 Guthy et al. ............... 375/267
2011/0222498 A1* 9/2011 Chun et al. ................. 370/329
2012/0026940 A1* 2/2012 Barbieri et al. ............. 370/328
2012/0289266 A1* 11/2012 Park et al. .................. 455/501

OTHER PUBLICATIONS

V. Jungnickel, A. Forck, S. Jaeckel, F. Bauermeister, S. Schiffermueller, S. Schubert, S. Wahls, L. Thiele, T. Haustein, W. Kreher, J. Mueller, H. Droste, and G. Kadel, "Field Trials Using Coordinated Multi-Point Transmission in the Downlink," in IEEE PIMRC Workshops, 2010.

S. Gollakota, S. D. Perli, and D. Katabi, "Interference Alignment and Cancellation," in Proc. of ACM SIGCOMM, 2009.

V. Cadambe and S. Jafar, "Interference Alignment and Degrees of Freedom of the K-User Interference Channel," IEEE Transactions on Information Theory, vol. 54, No. 8, 2008.

K. S. Gomadam, V. R. Cadambe, and S. A. Jafar, "Approaching the Capacity of Wireless Networks through Distributed Interference Alignment," CoRR, vol. abs/0803.3816, 2008.

K. Balachandran, J. Kang, K. Karakayali, and K. Rege, "NICE: A Network Interference Cancellation Engine for Opportunistic Uplink Cooperation in Wireless Networks," IEEE Transactions on Wireless Communications, vol. 10, No. 2, 2011.

M. Sadek, A. Tarighat, and A. Sayed, "A leakage-based precoding scheme for downlink multi-user mimo channels," Wireless Communications, IEEE Transactions on, vol. 6, No. 5, 2007.

A. Khattab, J. Camp, C. Hunter, P. Murphy, A. Sabharwal, and E. W. Knightly, "WARP: a Flexible Platform for Clean-Slate Wireless Medium Access Protocol Design," SIGMOBILE Mob. Comput. Commun. Rev., vol. 12, 2008.

D. Gesbert, S. Hanly, H. Huang, S. Shamai Shitz, O. Simeone, and W. Yu, "Multi-Cell MIMO Cooperative Networks: A New Look at Interference," IEEE Journal on Selected Areas in Communications (JSAC), vol. 28, No. 9, 2010.

M. Guillaud and D. Gesbert, "Interference Alignment in the Partially Connected K-User MIMO Interference Channel," in Proc. of European Signal Processing Conference (EUSIPCO), 2011.

K. Jamieson, "The SoftPHY Abstraction: from Packets to Symbols in Wireless Network Design," Ph.D. Thesis, MIT, 2008.

* cited by examiner

Algorithm 1 Downlink operations of each user $i$ in DIAC.

1. Input: vector of data $X^{[i]}$; receiver projection matrix $U^{[i]}$ and transmitter precoding matrix $V^{[i]}$.
   /* $U^{[i]}$ is calculated from Eq. (6) to Eq. (7); $V^{[i]}$ is calculated as its dual (Sec. III-B4) */
2. /* BS operations: */
3. $\chi^{[i]} = V^{[i]} X^{[i]}$
4. while link $i$ is not decodable and received no sync
5. do
6. Receive shared data $\chi^{[k]}$ from the BS of $\{k : k \in R(i), k \text{ is decodable}\}$.
7. Encode to precancel the interference:
   $\chi^{[i]} \leftarrow \text{DPC}(\chi^{[i]}, \chi^{[k]})$
8. if No update within the current round
9. BS $i$ sends notification message to coordinator.
10. endif
11. done
12. if link $i$ is decodable
13. pass $\chi^{[i]}$ to the BS of $\{j : i \in R(j), j \text{ is not decodable}\}$
14. BS $i$ waits for sync message and then send $\chi^{[i]}$.
15. endif
16. /* Client's operations: */
17. After reception, client $i$ applies interference projection:
    $Y^{[i]} \leftarrow U^{[i]} Y^{[i]}$ and then decode.
18. /* Coordinator's operations: */
19. foreach time slot
20. if received notification message from all BSs
21. Broadcast sync message
22. endif
23. endfor

FIG. 11

Algorithm 2 Uplink operations of each user $i$ in DIAC.

1. Input: vector of data $X^{[i]}$; receiver projection matrix $U^{[i]}$ and transmitter precoding matrix $V^{[i]}$.
   /* $U^{[i]}$ is calculated from Eq. (6) to Eq. (7); $V^{[i]}$ is calculated as its dual (Sec. III-B4) */
2. /* Coordinator's operations: */
3. Broadcast sync message to all BSs.
4. /* Client's operations: */
5. $\chi^{[i]} = V^{[i]} X^{[i]}$
6. Client $i$ waits for sync message and then sends $\chi^{[i]}$.
7. /* BS's operations: */
8. Send sync message to client, after receiving sync message from coordinator.
9. Receive signals from clients.
10. while link $i$ is not decodable and received no stop
11. do
12. Receive shared data $\chi^{[k]}$ from the BS of $\{k : k \in R(i), k \text{ is decodable}\}$.
13. Reconstruct the interference from $k$:
    $Y^{[ik]} \leftarrow H^{[ik]} \chi^{[k]}$
14. Cancel the interference using SIC: $Y^{[i]} \leftarrow Y^{[i]} - Y^{[ik]}$
15.   if No update within the current round
16.     BS $i$ sends notification message to coordinator.
17.   endif
18. done
19. if link $i$ is decodable
20.   BS$i$ passes the decoded $V^{[i]} X^{[i]}$ to the BS of $\{j : i \in R(j), j \text{ is not decodable}\}$
21. endif
22. BS $i$ decodes after applying interference projection:
    $Y^{[i]} \leftarrow U^{[i]} Y^{[i]}$

FIG. 12

COORDINATED MULTI-POINT TRANSMISSION

This application claims the benefit of U.S. Provisional Application No. 61/540,184, entitled, "Exploiting Interference Locality in Coordinated Multi-Point Transmission Systems," filed Sep. 28, 2011, the contents of which are incorporated herein by reference.

BACKGROUND OF THE INVENTION

The present invention relates to Coordinated Multi-Point (CoMP) transmission in wireless communications and more particularly to interference suppression for CoMP transmission.

CoMP transmission is an emerging technology that can suppress interference and improve the capacity of multi-cell wireless networks. However, existing CoMP techniques either require sharing of data and channel-state information (CSI) for all links in the network, or have limited capability of interference suppression.

By allowing information sharing and cooperation between transmitters, CoMP transmission can drastically reduce inter-cell interference, thereby improving the capacity of an entire network. Its advantages have been validated both theoretically and experimentally.

CoMP transmission requires the transmitters to share CSI. However, CSI-sharing only has a limited advantage in suppressing interference. By augmenting data sharing, more interference between neighboring links can be removed.

For example, when using zero-forcing (ZF) precoding, multiple links are combined into one multiple-input multiple-output (MIMO) transmission via CSI/data sharing of transmitters, and each link can transmit as if there is no mutual interference. However, such a scheme may need to group links into clusters Links near the cluster edge still suffer from interference with neighboring clusters. To reduce such an edge effect and enable concurrent transmission of many links, links of the entire network may need to be grouped and cooperate with each other. This situation may be unrealistic for large networks, due to limited capacity of the backhaul network used for information sharing among the links.

The following references are related to interference suppression in CoMP transmission:

[1] Sawahashi, M. and Kishiyama, Y. and Morimoto, A. and Nishikawa, D. and Tanno, M., "Coordinated Multi-point Transmission/Reception Techniques for LTE-Advanced [Coordinated and Distributed MIMO]," IEEE Wireless Communications, vol. 17, no. 3, 2010.

[2] V. Jungnickel, A. Forck, S. Jaeckel, F. Bauermeister, S. Schiffermueller, S. Schubert, S. Wahls, L. Thiele, T. Haustein, W. Kreher, J. Mueller, H. Droste, and G. Kadel, "Field Trials Using Coordinated Multi-Point Transmission in the Downlink," in IEEE PIMRC Workshops, 2010.

[3] S. Gollakota, S. D. Perli, and D. Katabi, "Interference Alignment and Cancellation," in Proc. of ACM SIGCOMM, 2009.

[4] V. Cadambe and S. Jafar, "Interference Alignment and Degrees of Freedom of the K-User Interference Channel," IEEE Transactions on Information Theory, vol. 54, no. 8, 2008.

[5] K. S. Gomadam, V. R. Cadambe, and S. A. Jafar, "Approaching the Capacity of Wireless Networks through Distributed Interference Alignment," CoRR, vol. abs/0803.3816, 2008.

[6] S. Gollakota, S. D. Perli, and D. Katabi, "Interference Alignment and Cancellation," in Proc. of ACM SIGCOMM, 2009.

[7] K. Balachandran, J. Kang, K. Karakayali, and K. Rege, "NICE: A Network Interference Cancellation Engine for Opportunistic Uplink Cooperation in Wireless Networks," IEEE Transactions on Wireless Communications, vol. 10, no. 2, 2011.

[8] M. Sadek, A. Tarighat, and A. Sayed, "A leakage-based precoding scheme for downlink multi-user mimo channels," Wireless Communications, IEEE Transactions on, vol. 6, no. 5, 2007.

[9] A. Khattab, J. Camp, C. Hunter, P. Murphy, A. Sabharwal, and E. W. Knightly, "WARP: a Flexible Platform for Clean-Slate Wireless Medium Access Protocol Design," SIGMOBILE Mob. Comput. Commun. Rev., vol. 12, 2008.

[10] D. Gesbert, S. Hanly, H. Huang, S. Shamai Shitz, O. Simeone, and W. Yu, "Multi-Cell MIMO Cooperative Networks: A New Look at Interference," IEEE Journal on Selected Areas in Communications (JSAC), vol. 28, no. 9, 2010.

[11] M. Guillaud and D. Gesbert, "Interference Alignment In The Partially Connected K-User MIMO Interference Channel," in Proc. of European Signal Processing Conference (EUSIPCO), 2011.

[12] K. Jamieson, "The SoftPHY Abstraction: from Packets to Symbols in Wireless Network Design," Ph.D. Thesis, MIT, 2008.

CoMP transmission may take many forms, depending on the scale of cooperation (e.g., intra-cell or inter-cell), the information to be shared (e.g., CSI sharing or both CSI and data sharing), etc. [1]. As mentioned above, the existing CoMP schemes may need to cluster links, and links near the cluster edge may severely interfere with other links. To increase the degrees of freedom in the network (e.g., the number of concurrent transmissions), such schemes may need to increase the cluster size accordingly, which is impractical due to the formidable overhead in delivering all the shared data and CSI.

MIMO stream control [3] is an alternative way of improving the degrees of freedom. Given the channel matrix between interferers/transmitters and the receiver, stream control is able to suppress (N−1) interferers and receive 1 useful stream of data, assuming there are N antennas. However, stream control is not scalable because its achievable degrees of freedom strongly depend on the number of antennas, which is limited in practice.

In [8], a distributed algorithm that suppresses the leakage interference to neighboring links by maximizing the signal-to-leakage-and-noise ratio (SLNR) is proposed. We will show that the distributed algorithm (hereafter referred to as max SLNR) may be a special case of distributed interference alignment, and explain the factors behind its low performance compared with other schemes.

Balachandran et al. [7] proposed a network cancellation algorithm for the uplink of CoMP systems. The basic idea is to allow links that can decode their frames to send the decoded packets to other links, which then cancel such known interference using successive interference cancellation (SIC). In distributed interference alignment and cancellation (DIAC), the localized uplink cancellation works in a similar way, but is integrated with interference alignment that substantially improves the interference suppression capability. In addition, we design a distributed, DPC (dirty-paper-coding)-based algorithm that is applicable to the downlink of multi-cell networks.

Interference alignment [4] may be a promising mechanism for improving the network degree of freedom. In theory, it can achieve MK/2 total degrees of freedom when there are K links in the network each with M×M MIMO (assuming half-duplex radios), i.e., half of the links can transmit concurrently. However, this ideal bound is achievable when the channel is highly dynamic, e.g., when the channel state changes over each symbol, which conversely renders channel estimation infeasible. In practice, interference alignment can be realized by designing the precoding matrix at the transmitter and the projection matrix at the receiver. The matrix design is equivalent to an over-constrained system of equations, and typically a subset of the constraints can be satisfied. Equivalently, a limited number of interferers can be suppressed. In DIAC, we adopt a similar approach of matrix design, but integrate it with interference cancellation, thus further improving the total degrees of freedom in the network.

In [6], Gollakota et al. implemented a preliminary version of interference alignment, and integrated interference alignment with SIC on the uplink to improve the number of concurrent transmissions. However, [6] is applicable for a single collision domain (e.g., where all links interfere with each other), and is not scalable in large wireless networks. In fact, the scheme in [6] can tolerate at most 2M concurrent uplink transmissions when each node has M antennas (and even fewer for the downlink), i.e., the degrees of freedom is eventually limited by the number of antennas on each node. In DIAC, by leveraging the locality of interference, it is possible to allow all links in a network to transmit concurrently even with a limited number of antennas.

We propose distributed interference alignment and cancellation (DIAC) to overcome these limitations. DIAC builds on a key intuition of interference locality—since each link interferes with a limited number of neighboring links, it is sufficient to coordinate with those strong interferences and ignore others, in order to limit the overhead in CoMP. DIAC realizes the localized coordination by integrating interference cancellation and distributed interference alignment, and can be applied to both the uplink and downlink of multi-cell wireless networks. To validate DIAC, we use both model-driven simulation and trace-based simulation where the traces are collected by implementing a MIMO-OFDM channel estimator on a software radio platform. Our experiments show that DIAC can substantially improve the degrees of freedom in multi-cell wireless networks.

BRIEF SUMMARY OF THE INVENTION

An objective of the present invention is to cancel or remove interference in a multiple-input multiple-output (MIMO) wireless system supporting Coordinated Multi-Point (CoMP) transmission.

Another objective of the present invention is to achieve low overhead and low cost.

Still another objective of the present invention is to achieve high throughput in downlink and uplink communications.

An aspect of the present invention includes, in a multiple-input multiple-output (MIMO) wireless system supporting Coordinated Multi-Point (CoMP) transmission and having a first base station, a second base station, and a user equipment, a communications method implemented in the first base station. The communications method includes exchanging, with the second base station through local information exchange, first information about a first channel between the first base station and the user equipment and second information about a second channel between the second base station and the user equipment, and computing at least one of a precoding matrix, a receiver filter, and a projection matrix, wherein the user equipment estimates the first information and the second information, and shares the first information and the second information with the first base station.

Another aspect of the present invention includes, in a multiple-input multiple-output (MIMO) wireless system supporting Coordinated Multi-Point (CoMP) transmission and having a first base station, a second base station, a first user equipment, and a second user equipment, a communications method implemented in the first user equipment. The communications method includes exchanging, with the second user equipment through local information exchange, first information about a first channel between the first base station and the first user equipment and second information about a second channel between the second base station and the first user equipment, and computing at least one of a precoding matrix, a receiver filter, and a projection matrix, wherein the first user equipment estimates the first information and the second information, and shares the first information and the second information with the first base station and the second base station.

Still another aspect of the present invention includes a multiple-input multiple-output (MIMO) wireless system supporting Coordinated Multi-Point (CoMP) transmission. The MIMO wireless system includes a first base station, a second base station, and a user equipment, wherein the first base station exchanges, with the second base station through local information exchange, first information about a first channel between the first base station and the user equipment and second information about a second channel between the second base station and the user equipment, wherein the first base station computes at least one of a precoding matrix, a receiver filter, and a projection matrix, and wherein the user equipment estimates the first information and the second information, and shares the first information and the second information with the first base station.

Still another aspect of the present invention includes a multiple-input multiple-output (MIMO) wireless system supporting Coordinated Multi-Point (CoMP) transmission. The MIMO wireless system includes a first base station, a second base station, a first user equipment, and a second user equipment, wherein the first user equipment exchanges, with the second user equipment through local information exchange, first information about a first channel between the first base station and the first user equipment and second information about a second channel between the second base station and the first user equipment, wherein the first user equipment computes at least one of a precoding matrix, a receiver filter, and a projection matrix, and wherein the first user equipment estimates the first information and the second information, and shares the first information and the second information with the first base station and the second base station.

BRIEF DESCRIPTION OF THE DRAWINGS

FIG. 11 depicts an example of algorithm for downlink (algorithm 1).

FIG. 12 depicts another example of algorithm for uplink (algorithm 2).

DETAILED DESCRIPTION

Figure 1:
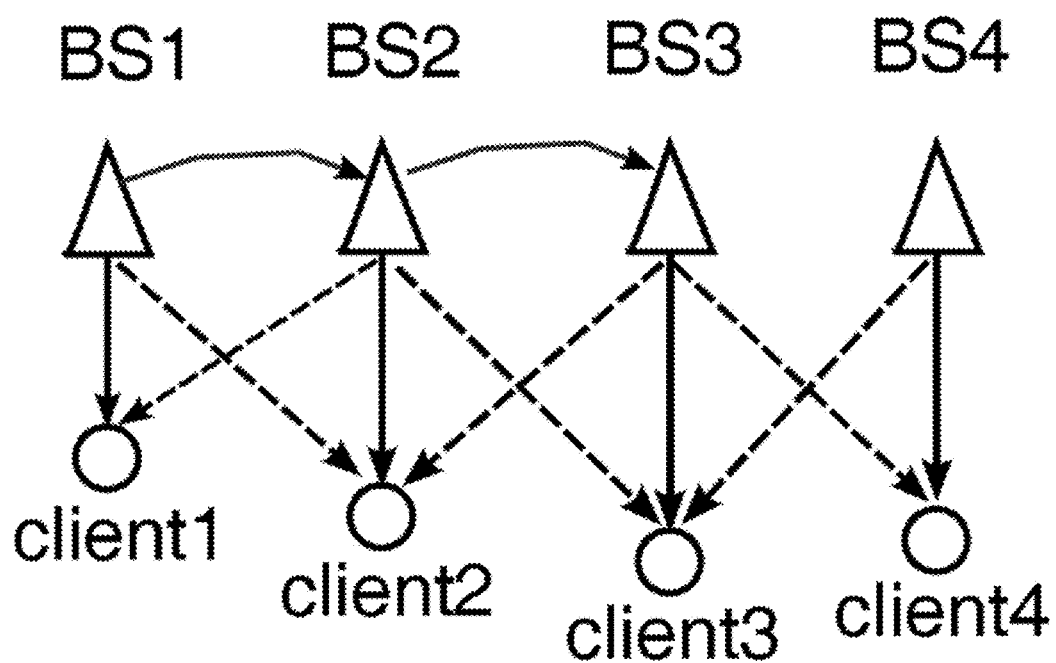
FIG. 1 depicts an example of localized downlink cancellation in DIAC.

We propose distributed interference alignment and cancellation (DIAC), which overcomes the limitations by leveraging interference locality. Due to limited interference range of transmitters, each link interferes with a limited number of neighboring links. Therefore, it is sufficient to allow each link to coordinate with the neighboring links, which dominant interference comes from. However, such localized coordination cannot be realized by existing interference suppression algorithms such as ZF precoding, because a link may need to coordinate with two sets of neighbors that are unaware of each other (and thus the precoding vectors conflict). DIAC meets these challenges by a joint design of localized interference cancellation and distributed interference alignment. In DIAC, each link shares data and CSI with, and cancels the interferences from, neighboring links (i.e., a small set of coordination points). On the downlink, it pre-cancels interferences using a localized version of DPC, which may only need the composite DPC-coded information from neighbors. On the uplink, the base station receives decoded data from neighbors, reconstructs the interfering signals, and cancels them using SIC.

Such downlink/uplink cancellation is performed within the signals' constellation. On the antenna domain, DIAC further applies distributed interference alignment (DIA) that attempts to align interferences to a dimension orthogonal to the useful signals. This is realized by allowing links to share CSI with neighbors, and then iteratively design the precoding/projection matrix at the transmitter/receiver side, so as to minimize leakage interference to neighbors. We evaluate the performance of DIAC using trace-driven simulation. We implement a MIMO-OFDM channel estimator on the WARP software radio testbed, collect channel matrices between the transmitters and receivers, and then feed these traces to a Matlab simulator for DIAC. Our experiments show that DIAC can enable concurrent transmissions of multiple links with a limited number of antennas. To further understand the performance of DIAC at large scale, we simulate DIAC under an empirical propagation model. Our experiments reveal that the number of antennas and scale of coordination may affect DIAC, but the effects diminishes as both factors increase.

The present invention pertaining to design of distributed interference alignment and cancellation has the following advantages:

1. DIAC can be employed both for (1) improving uplink transmission from multiple mobile stations (MS's) or clients to their respective base stations (BS's) or access points (AP); and (2) improving downlink transmission from multiple BS's to their respective MS's. A mobile station is also known as a user equipment.

2. DIAC uses local information exchange and hence has lower overhead and cost associated with it.

3. DIAC employs multi-stage interference cancellation in the form of successive interference cancellation (SIC) implemented by sharing information at each stage between the set of local neighbors after successful decoding (in the uplink implementation case) or after calculation of the anticipated Signal to Interference plus Noise Ratio (SINR) prior to the transmission and comparing with an appropriate threshold to decide the decodability by the MS (in the case of the downlink implementation).

4. DIAC can achieve high throughput in the downlink and uplink.

DIAC includes two main steps:

In the first step, the information about the channel between an MS and a BS in the neighborhood is exchanged though the local information exchange (LEX). Based on this information, the precoding matrices to be used by the transmitters and the receiver filters (or projection matrices) to be used by the receivers are computed locally at all transmitters and receivers, which are MS's and BS's depending on whether uplink or downlink is considered. The LEX about the channel information may be performed in several ways. Each receiver (for example, an MS in the case of downlink) may estimate the channel from several transmitters in the neighborhood and shares this information with its respective transmitter (for example the associated BS in the case of downlink). Then the BS's share the information within their localities though LEX. In the case of uplink, the channel information from several MS's in the neighborhood will be obtained by each BS and then the BS's share this information within their localities. For example, in the downlink, each receiver (or each MS) may estimate the channels from several BS's and then directly shares this information with all BS's in its locality. FIG. 1 shows an example of an information exchange process.

In the second step of DIAC, the interference cancellation happens. This process is different in the downlink or uplink.

In the uplink (Algorithm 2, FIG. 12) all the BS's try to decode the messages received from their respective MS's; if successful in decoding, then they share the decoded information with their neighbors defined by the locality information table. However, the decoded data will be first precoded with the precoding matrix of the user before sharing or information about this precoder may be shared. The signal that is transmitted from the corresponding user may be shared as the precoded version of the information packet. If a base station cannot perform the decoding it sends a message to a coordinator. The coordinator could be one of the base stations or an independent entity. If the coordinator receives this "no decoding possibility" message from all BS's in one time slot, it stops the process. Otherwise, there is at least one BS that has performed successful decoding in the last time slot and has shared its message with its neighbors. Therefore some neighbors might be able to decode in the next time slot. Each BS that has not decoded its message yet tries to cancel the interference by removing the contribution of the known decoded messages from its received signal through SIC. In case that a BS can decode a message, it will share it again and the process continues. It is also possible that a BS receives several decoded messages from its neighbors in which case it can still perform SIC on all of the messages in one time slot and tries to decode its message.

The operation in the downlink (Algorithm 1, FIG. 11) is different because the cancellation is performed prior to the actual transmission. There will be a phase where multiple base stations try to anticipate if their corresponding MS's can decode the message after the transmission happens. This can be done by calculating the post scheduling SINR, which means the BS calculates the received SINR by its MS's under the current condition and known information that is shared though LEX at a given time slot. The anticipated SINR obviously can be different in a future time slot due to the fact that, if a BS has information about an interfering signal, the BS can account for the interfering signal and pre-cancels the interference and hence can improve the post scheduling SINR. A BS may not transmit if, after receiving a sync message from the coordinator, the anticipated SINR for its user is below a threshold. A BS may choose to transmit its message after it receives the Sync message from the coordinator, even if the anticipated SINR for this user is not enough to allow decoding of the message from the MS. This decision may be based on a threshold that is different from the threshold for decodability of the packets. Decodability may be defined as the ability to decode or the possibility to decode.

For example, the decodability of the packets may be based on a probability measure and an SINR, such as a 10% packet drop rate at a given SINR. However, the transmission SINR threshold could be based on, for example, an SINR corresponding to a 30% packet drop rate.

A BS may receive multiple shared data from its neighbors; therefore it can apply DPC simultaneously in order to cancel the effect of multiple known signals. A BS may still perform DPC sequentially even if it receives the shared data information from multiple neighbors. We also note that in the downlink the information that is shared may be different from the information that is shared in the uplink. In the uplink, the information that is shared is the transmit packet of the users that is precoded by the precoding matrix of the same user. However, the decision to share this information depends on whether or not the corresponding BS has been able to decode this message at a given time slot. In the downlink, not only does the decision about sharing this data at a given time slot depend on the anticipated decodability by the corresponding user, but also the actual shared data is the precoded version of this information. This data sharing can be a dirty paper coded (DPC) version of the users data pre-canceled through the knowledge of the known interferences up to the current time slot. This data could be a Tomlinson-Harashima (TH) precoded version of the user signal with the known interfering signal. The vector perturbation technique can be used instead of DPC. The effect of another interferer might be directly included in this signal or a precoded version of the interferer might be included.

Algorithm 1 describes a possible transmission scheme in the downlink. First, the SINR for all preselected users will be computed. This SINR computation is with the assumption that (1) each user employs a possible precoder that could be designed based on LEX; and (2) each user treats other users' signal as interference. If the SINR computation at this step is above a threshold that could be based on the coding rate and modulation type (MCS modulation and coding scheme) selected for this user, then this user is considered to be decodable and to pass information about its packet to its neighboring transmitters through LEX. Second, for the remaining users and in particular the users that have received information from their neighbors their SINRs are recalculated based on the new information by assuming that a pre-cancellation of the known interference will be employed. If for some users the newly calculated SINR is above a threshold, then these users are also considered decodable. The threshold for the second calculation may be different from or the same as the threshold for the first calculation. The decodable users share their data through LEX. The information sharing though LEX could be in the form of raw data of the user. This information could be a precoded data. This information could be a dirty paper coded (or practical version of DPC such as Tomlinson-Harashima (TH)) version of the user packets. The second step of the algorithm will be performed again based on all the shared information from all the users and SINRs will be computed again; and newly decodable users will be selected based on comparing new SINRs with a decoding threshold. This process continues until a predetermined number of iteration is reached or no newly decodable user is selected. After all the decodable users are selected, the actual transmission starts simultaneously by receiving a sync signal from the coordinator.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

FURTHER SYSTEM DETAILS

I. Introduction

Recently, Coordinated Multi-Point (CoMP) transmission has emerged as a promising communication paradigm for multi-cell wireless networks. By allowing information sharing and cooperation among multiple transmitters, CoMP can dramatically reduce inter-cell interference, thereby improving the capacity of an entire network. Its advantages have been validated both theoretically [1] and experimentally [2].

CoMP requires the transmitters to share channel-state-information (CSI). By augmenting data sharing, interference between neighboring links can be further suppressed. For example, when using zero-forcing (ZF) precoding, multiple links are combined into one MIMO via CSI/data sharing between transmitters, and each link can transmit as if there were no mutual interference. However, such schemes need to group links into clusters. Links near the cluster edge still suffer from interference from neighboring clusters. To eliminate such edge effect and enable concurrent transmission of all links, the entire network of links need to be grouped and cooperate with each other. This becomes unrealistic for large networks, due to limited capacity of the backhaul network used for information sharing between links.

Interference alignment (IA) [4] is arguably the most promising mechanism that suppresses interference in CoMP systems. In theory, it can achieve MK/2 total degrees of freedom (DOFs) when there are K links in the network each with M×M MIMO, i.e., half of the links can transmit concurrently. But this ideal bound has not been realized due to practical constraints, and approximate solutions based on precoding and projection filtering have been proposed [5]. In [6], Gollakota et al. implemented a preliminary version of interference alignment called IAC which integrates IA with successive interference cancellation (SIC) on the uplink. IAC is centralized and is not scalable to large wireless networks, because it assumes all links interfere and share information with each other. Its achievable DOF is eventually limited by the number of antennas on each node, and does not scale as the network site grows.

Distributed algorithms with limited information sharing have also been proposed for CoMP. For example, NICE [7] allows uplinks that can decode their frames to send the decoded packets to other base stations (BSs), who then cancel such known interference using SIC. MaxSLNR [8] suppresses the leakage interference to neighboring links and only requires CSI sharing between neighbors. However, existing distributed algorithms for CoMP have limited capability for suppressing interference.

We propose distributed interference alignment and cancellation (DIAC), which overcomes the above limitations by leveraging interference locality. Due to limited interference range of transmitters, each link is interfered by a limited number of neighboring links. So, it is sufficient to allow each link to coordinate with the neighboring links where dominant interference comes from. This in turn bounds the traffic load on the backhaul network. However, it is not straightforward to extend existing CoMP algorithms to support such localized coordination. For example, when using ZF precoding, the precoding vector designed for one link (and its neighbors) may conflict with that of a neighboring link (which may not have exactly the same set of neighbors). Consequently, the precoded signals may become random interference to neighboring links, and the resulting SINR may be even worse than without precoding. DIAC meets this challenge by a joint design of localized interference cancellation and distributed interference alignment.

In DIAC, each link shares data and CSI with, and cancels the interferences from only neighboring links (i.e., a small set of coordination points). On the uplink, the base station receives decoded data from neighbors, reconstructs the interfering signals, and cancels them using successive interference cancellation (SIC). The downlink operation is more involved. Since clients cannot share data and perform SIC, the interference needs to be pre-cancelled at BSs. As mentioned above, existing pre-cancellation strategies for CoMP (e.g., ZF-precoding) become ineffective due to conflict of precoding vectors. DIAC solves this problem using a localized version of dirty-paper-coding (DPC), which only needs the composite DPC-coded information from neighbors. DIAC further applies distributed interference alignment (DIA) [5] that attempts to align interferences to a dimension orthogonal to the useful signals. This is realized by allowing links to share CSI with neighbors, and then iteratively design the precoding/projection matrix at the transmitter/receiver side, so as to minimize leakage interference to neighbors.

We evaluate the performance of DIAC using trace-driven simulation. We implement a MIMO-OFDM channel estimator on a WARP [9] software radio testbed, collect channel matrices between the transmitters and receivers, and then feed these traces to a Matlab simulator for DIAC. Our evaluation shows that DIAC can enable concurrent transmissions of multiple links even with a limited number of antennas. To further understand the performance of DIAC at large scale, we simulate DIAC under an empirical propagation model. Our experiments have revealed that the number of antennas and the scale of coordination may affect DIAC, but the effects diminish as both factors increase. Therefore, to exploit the benefits of DIAC while bounding the coordination overhead, it is sufficient for each link to restrict the coordination to a small set of neighboring links.

The remainder is structured as follows. In Sec. II, we present our system models and details of the DIAC algorithm. Sec. III, we introduce the design and implementation of the MIMO-OFDM channel estimator in the WARP platform. Sec. IV describes our experimental results and finally,

II. Algorithm Design For DIAC

A. Basic Models

1) Precoding/Projection Model:

We consider a multi-cell network (wireless LANs or LTE cellular networks) consisting of K cells. Each cell includes one link (also referred to as one user) between a base station (BS) and a client. The AP and the client have M and N antennas, respectively. d streams of data are transmitted over each link, with $d \leq \min(M, N)$.

Let $X^{[k]}$ be the $d \times 1$ vector of data symbols to be transmitted by user k, V be the $M \times d$ precoding matrix for the transmitter, U the $N \times d$ projection matrix for the receiver, $H^{[kl]}$ the $M \times N$ channel matrix for transmitter l and receiver k. Using the superscript [k] to denote variables for user k, the received signal of user k is:

$$Y^{[k]} = (U^{[k]})^\dagger \left( \sum_{l=1}^{K} H^{[kl]} V^{[l]} X^{[l]} \right) + Z^{[k]} \quad (1)$$

where $Z^{[k]}$ is the AWGN matrix; $(\bullet)^\dagger$ is the complex conjugate operator. We assume equal power allocation among data streams, i.e., each stream has power of P/d, where P is the total power of a transmitter.

2) Localized Coordination:

CoMP systems may require coordinating base stations to share both data and CSI in real-time, and therefore, the backhaul wired network connecting them have sufficiently large capacity and low latency to effectively support such coordination [10]. However, as the network size grows, such requirements become infeasible in practice.

In DIAC, we restrict the scale of coordination within the locality of each user, thereby bounding the amount of shared data/CSI and their propagation distance along the wired backhaul. We define the locality of coordination according to potential interference. The potential interference of link j to link i is:

$$I_{ij} = \frac{P_{ij}}{P_{ii}} \quad (2)$$

where $P_{ij}$ is the signal power leaked from link j's transmitter o link i's receiver. A neighboring link j is included into link i's set of coordinating points R(i), only if $I_{ij}$ is larger than a threshold $T_i$, i.e., $$R(i) = \{j : I_{ij} > T_i, j \neq i\} \quad (3)$$

As a result, each user i, only needs to collect data/CSI from a small set of |R(i)| neighbors, and suppress interferences from them.

Note that $j \neq R(i)$ may still cause interference to i, but DIAC does not attempt to suppress such interference, so that the locality of coordination (|R(i)|) can be bounded. |R(i)| essentially reflects a tradeoff between the performance of DIAC and its overhead—a large R(i) improves decoding performance by suppressing interference from more users, but meanwhile it requires the data and CSI to be shared with more users (i.e., heavier load on the backhaul). We will evaluate such effects in our experiments (Sec. IV).

B. The DIAC Algorithm

In DIAC, we design a localized interference cancellation algorithm, and integrate it with distributed interference alignment (DIA), such that the network can support a large number of concurrent transmissions. In what follows, we first introduce the cancellation algorithm (for downlink and uplink, respectively), and then discuss how it can incorporate DIA.

1) Challenges for Localized Cancellation:

Existing work has explored centralized algorithms for integrating interference cancellation with interference alignment in a fully-connected network (i.e., every link interferes and coordinates with all other links) [6]. The basic idea is to first order the links, and ensure one link (e.g., link 1) is decodable after interference alignment, and cancel its signals from link 2; and then cancel link 1 and link 2's signals at link 3, etc. However, it is non-trivial to generalize it for practical partially-connected networks (i.e., each link coordinates only with a limited number of neighboring links), because for such networks, no closed-form interference alignment solution exists that can ensure a specific link is decodable, and it is unknown how the links can be ordered to jointly perform cancellation and alignment.

The localized downlink interference cancellation is even more challenging and to our knowledge, has not been explored in previous works. Intuitively, the downlink cancellation can be realized by joint precoding between neighboring BSs. However, in partially-connected networks, joint precoding becomes infeasible due to conflicting precoding vectors between different neighboring sets. For example, this happens in FIG. 1 when locality of coordination is restricted to adjacent links. It is feasible for BS2 to jointly design the precoder with BS1 and BS3, and BS3 with BS2 and BS4. But the resulting precoding vectors of BS2 and BS3 will conflict with each other, as they take into account information from different sets of links. Thus a straightforward application of the precoding may cause random interference, and perform even worse than without precoding.

2) Localized Downlink Interference Cancellation:

On the downlink, each user i pre-cancels interference from neighbors in R(i) in a distributed manner. Simply put, whenever a user j∈R(i) is decodable (i.e., it has sufficient SINR to decode its data), its BS shares the to-be-sent data (interference for other users) with users {k:j∈R(k)} (which includes i). Then BS i encodes and pre-cancels the interference using dirty-paper-coding (DPC), based on the channel matrix from the transmitters in R(i) and its own receiver. Afterwards the receiver of link i no longer experiences any interference from the transmitter of link j. Note that DIAC also requires the channel matrix between dominant interferers (those in R(i)) and the receiver of i. The estimation of channel matrix between each transmitter and receiver will be discussed in Sec. III.

A key feature of the downlink cancellation in DIAC is decentralization: it only requires neighboring users to exchange encoded signals, without accounting for other interferers. FIG. 1 illustrates an example of such localized downlink cancellation, where we restrict the locality of coordination to adjacent users. Suppose user 1 is able to decode its packet (possibly because of shorter link distance and higher SIR), then the corresponding transmitter (BS1) will pass the encoded samples $X^{[1]}$ of each frame to the transmitter of user 2 (i.e., BS2) through the wired backhaul. BS2 then encodes these samples using DPC in order to pre-cancel them. The resulting samples sent by BS2 will be a function of $X^{[1]}$ and its own data samples $X^{[2]}$. We denote this operation as: $\chi^{[2]} \leftarrow DPC(X^{[1]}, X^{[2]})$. After cancelling interference from user 1, user 2 may have sufficient SINR to decode its own frames (despite the unknown interference from user 3). Then, BS2 will pass its signals $\chi^{[2]}$ to the neighboring user 3 who cannot decode its signals yet. This procedure continues until no further pre-cancellation is possible. Afterwards, the users can transmit concurrently. Although the downlink interference cancellation is restricted within R(i), we will show in Sec. IV it can still substantially improve the number of concurrent transmissions.

3) Localized Uplink Interference Cancellation:

The uplink differs from the downlink in the content of information sharing—only decoded data needs to be shared between neighboring links. Take the network in FIG. 1 as an example. When BS1 can decode the data from client1, it will pass the digital data $X^{[1]}$ sent by client1 BS2. BS2 then cancels the interferences from client1 using successive interference cancellation (SIC). More specifically, it needs to reconstruct the interfering signals based on $X^{[1]}$ and the channel matrix from client1 to BS2, and then subtract them from the composite signals ($Y^{[2]}$) it received. Afterwards, if BS2 is able to decode its data, it will pass the original data $X^{[2]}$ in the same way (instead of passing a function of the data from both BS1 and BS2, as in the downlink case).

4) Matrix Design for Distributed Interference Alignment:

Besides the localized cancellation, DIAC employs distributed interference alignment (DIA) [5], [11], which calculates the preceding/projection matrix, so as to align interferences into a space orthogonal to useful signals. For the sake of completeness, we briefly introduce the matrix design for DIA, and then describe how it can be integrated with the localized cancellation algorithms in Sec. II-B5.

In classical interference alignment, all interferers' signals are aligned into the null space of each receiver k's projection matrix [5]. Equivalently, $$(U^{[k]})^\dagger H^{[kj]} V^{[j]} = 0, \forall j \neq k \quad (4)$$

This is often an over-constrained system of equations, and the closed-form solution remains an open problem. However, DIA [5] can be used as an approximate solution to the interference alignment problem, and is guaranteed to converge. The basic idea is to iteratively design the matrix U and V to minimize the LHS of Eq. (4). In each iteration, each receiver i calculates the projection matrix $U^{[i]}$ to minimize the leakage to j:i∈R(j):

$$U^{[i]} = \arg\min_{U^{[k]}} I^{[i]} = Tr[(U^{[k]})^\dagger Q^{[i]} U^{[k]}] \quad (5)$$

where $$Q^{[i]} = \sum_{j \in R(i)} \frac{P}{d} H^{[ij]} V^{[j]} (V^{[j]})^\dagger (H^{[ij]})^\dagger \quad (6)$$

is the interference covariance matrix at receiver k. The solution to the minimization problem is [5]:

$$U^{[k]} = u_d[Q^{[k]}] \quad (7)$$

where $u_d[A]$ denotes the d eigenvectors corresponding to the d smallest eigenvalues of matrix A. Then, given U, DIAC designs the precoding matrix V in a similarly way, but reverses the roles of the transmitter and receiver. The procedure iterates until the leakage interference $I^{[i]}$ is below a small threshold. The resulting precoding/projection matrices are used as input to the localized cancellation algorithms.

5) Summary of DIAC:

Based on the above description of operations, we summarize the downlink DIAC in Algorithm 1

On the downlink, before applying DPC, the BS precode the information bits (line 3) and then use the precoded data as input to the cancellation procedure. We assume the data/CSI sharing (before the actual transmission) can be done in a time-slotted, round-based manner. In each slot, each BS performs decodability check, information sharing, and pre-cancellation. If no operation can be done in the current time slot, it sends a notification message to a central coordinator (which can be one of the base stations). Once the coordinator receives the notification message from all users within the same slot, this time slot is used as a synchronization barrier—the coordinator will send a sync message to all BSs, allowing them to transmit concurrently.

The uplink operations can be done in a similar manner (we omit the details to avoid duplication). Note that DIAC requires the clients to send frames concurrently. We assume this is realized by synchronizing all BSs, and then allowing each BS to send a sync message to its client. The cancellation procedure is performed in a time-slotted manner similar to the uplink, and the coordinator will broadcast a stop message if it receives a notification message from every BS.

6) SINR Analysis:

After obtaining the V and U matrix, the SINR of the l-th stream of k-th receiver is:

$$SINR_{kl} = \frac{(U_{*l}^{[k]})^\dagger H^{[kk]} V_{*l}^{[k]} (V_{*l}^{[k]})^\dagger (H^{[kk]})^\dagger U_{*l}^{[k]}}{(U_{*l}^{[k]})^\dagger B^{[k]} U_{*l}^{[k]}} \frac{P}{d} \quad (8)$$

where $$B^{[k]} = \sum_{j \in R(k)} \frac{P}{d} \sum_{d=1, d \neq l}^{d} H^{[kj]} V_{*d}^{[j]} (V_{*d}^{[j]})^\dagger (H^{[kj]})^\dagger + I_{N^{[k]}} \quad (9)$$

is the interference covariance matrix, $U_{*l}^{[k]}$ denotes the l-th column of matrix $U^{[k]}$.

Assuming interferences are perfectly cancelled, after cancelling interference from user i, the resulting interference covariance matrix becomes:

$$B^{[k]} = \sum_{j \in R(k), j \neq i} \frac{P}{d} \sum_{d=1, d \neq l}^{d} H^{[kj]} V_{*d}^{[j]} (V_{*d}^{[j]})^\dagger (H^{[kj]})^\dagger + I_{N^{[k]}} \quad (10)$$

III. Implementation of MIMO-OFDM Channel Estimator

Our implementation consists of two parts: Matlab based simulation of the DIAC algorithm, and software radio (WARPLab [9]) based implementation of MIMO channel estimation algorithm, which is used to obtain traces of channel matrix between multiple links.

Figure 2:
FIG. 2 depicts a packet format for channel estimation.
Figure 3:
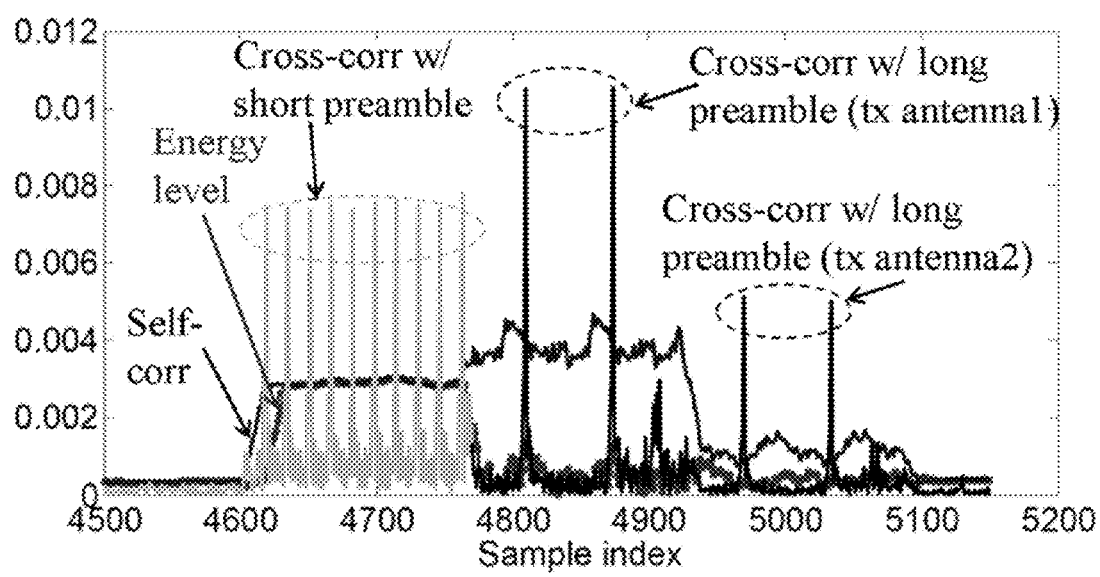
FIG. 3 depicts a packet detection and channel estimation procedure.

FIG. 2 and FIG. 3 show the transmitted packet format for for channel estimation, and the corresponding detection and estimation procedure at the receiver. The MIMO-OFDM packet preamble format follows that of the 802.11n standard. An 802.11 preamble (also referred to a STF) has 160 complex samples and occupies 64 subcarriers. From time-domain perspective, the STF is a periodic signal that repeats every 16 complex samples [ ]. The receiver performs self-correlation between the latest 16 samples and previous 16 samples, which has an outstanding output only if two consecutive sequences of samples match (i.e., an STF appears), and the corresponding output is comparable to the signal's energy level [ ]. After detecting the STF, the receiver further performs cross-correlation between the received STF samples and the original samples in the STF. An outstanding peak appears only when the received samples align with the known STF, and the peak position is used as a synchronization point marking the start of the packet.

To estimate the channel coefficients (including magnitude attenuation and phase distortion) of each subcarrier and the frequency offset between transmitter and receiver, an additional preamble is used, called long-training field (LTF). LTF comprises two duplicated versions of a random sequence (consisting of 1 and −1) of length 64 carried by the 64 subcarriers. To obtain the channel coefficients and frequency offset, the receiver performs self-correlation between the two truncated random sequences and normalizes it by the magnitude, similar to an 802.11 channel estimator [ ].

When running MIMO, all the transmit antennas share the same STF, but their LTFs are transmitted sequential i.e., while one antenna is transmitting, all others are silent (transmitting zero-power signals). Meanwhile, each receive antenna can estimate the channel between the active transmit antenna and itself.

Our ongoing work involves a full-fledged implementation of DIAC on WARP. As DIAC requires synchronization between neighboring base stations, we have modified the FPGA module in WARP to synchronize the carrier frequency, sampling clock, and packet starting time between multiple MIMO transmitters. We plan to implement a real-time version of DIAC on this platform, and demonstrate its performance in real environment.

IV. Experimental Results

We evaluate DIAC using i) trace-driven simulation, which collects real channel traces from a WARP MIMO testbed. ii) model-driven simulation, which applies an empirical pathloss and fading model to a synthetic topology. As benchmark comparison, we also consider the following distributed algorithms that can be applied to partially-connected networks, where each link either transmit independently, or only needs to collect data/CSI from neighboring links that interfere with it. i) Single-user MIMO beamforming via SVD. ii) Maximizing signal to leakage-interference and noise ratio (max SLNR) [8]. iii) Distributed interference alignment (DIA) [5], [11], which is equivalent to the alignment iteration of DIAC, i.e., each user attempts to align interference from others without cancellation.

A. Trace Based Simulation

Figure 4:
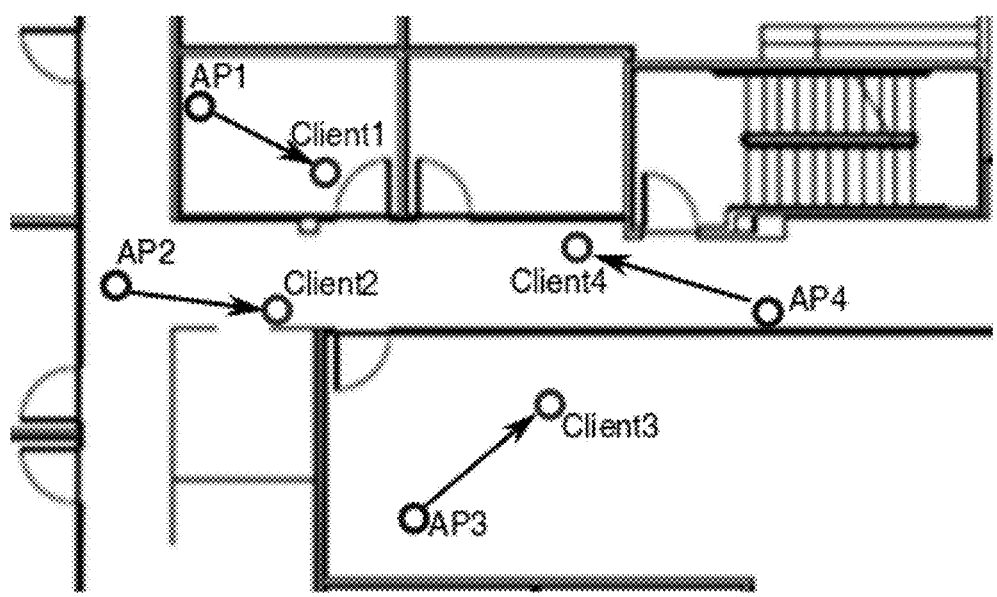
FIG. 4 depicts testbed node locations.

We set up a WARP testbed consisting of four 4×2 MIMO links located in an office environment. FIG. 4 shows the node locations. Two links are located within two different offices separated by two walls and a corridor; the other two links are located in the corridor. Due to the short transmission range of WARP radios, the distance between each transmitter and receiver is 2 to 5 meters; and the distance between each transmitter and neighboring transmitters is 4 to 8 meters. Given this topology, we test the DIAC and benchmark algorithms based on the MIMO-OFDM channel estimation results.

Figure 6:
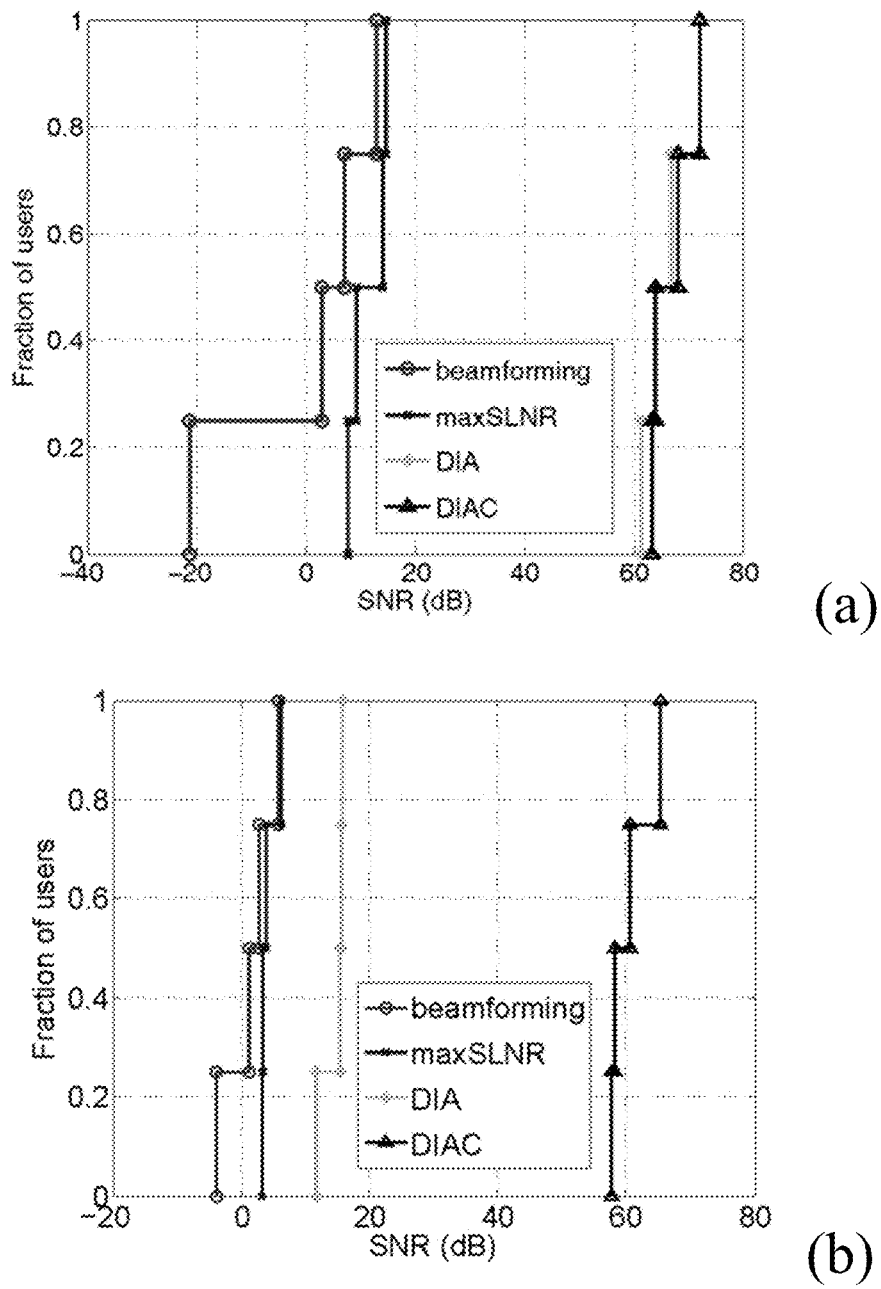
FIG. 6 depicts trace based simulation results (a) with 4×2 MIMO and (b) with 2×2 MIMO.

FIG. 6(a) shows the resulting SINR distribution when each link uses 4×2 MIMO to send one data stream. The interference alignment based approaches (i.e., DIA and DIAC) outperform beamforming and maxSLNR by around 50 dB, implying that they may completely suppress interference and enable concurrent transmissions, whereas alternative approaches result in collisions. Notably, DIAC shows marginal gain over DIAC under this setting. This is because the 4×2 MIMO is sufficient for DIA to suppress all interferences even without cancellation. When using 2×2 antennas, however, DIA alone is unable to achieve perfect alignment. All 4 links have less than 18 dB SINR (FIG. 6(b)). In contrast, by integrating interference cancellation, DIAC achieves more than 40 dB gain over DIA, thereby maintaining concurrent transmission of all links.

B. Model-Driven Simulation

Due to a limited number of WARP nodes, the trace-driven simulation only involves 4 MIMO links. To fully understand the factors that affect DIAC's performance in general network topologies, we further conduct model-driven simulation. We use an empirical propagation model recommended by the IEEE 802.15 for 2.4 GHz indoor environment to model large-scale fading. At distance d, the signal's pathloss (in dB) is:

$$L_{dB}(d) = \begin{cases} 40.2 + 20\log_{10}(d), & d \leq 8m \\ 58.5 + 33\log_{10}(d/8), & d > 8m \end{cases}$$

For small-scale fading, we use the Rayleigh fading model. When running DIAIC, we assume the SNR threshold for decoding is 10 dB. The transmit power of each node is $P_t=15$ dBm. We further assume the receiver noise power is $10^{-8}$ of the transmit power level.

Figure 5:
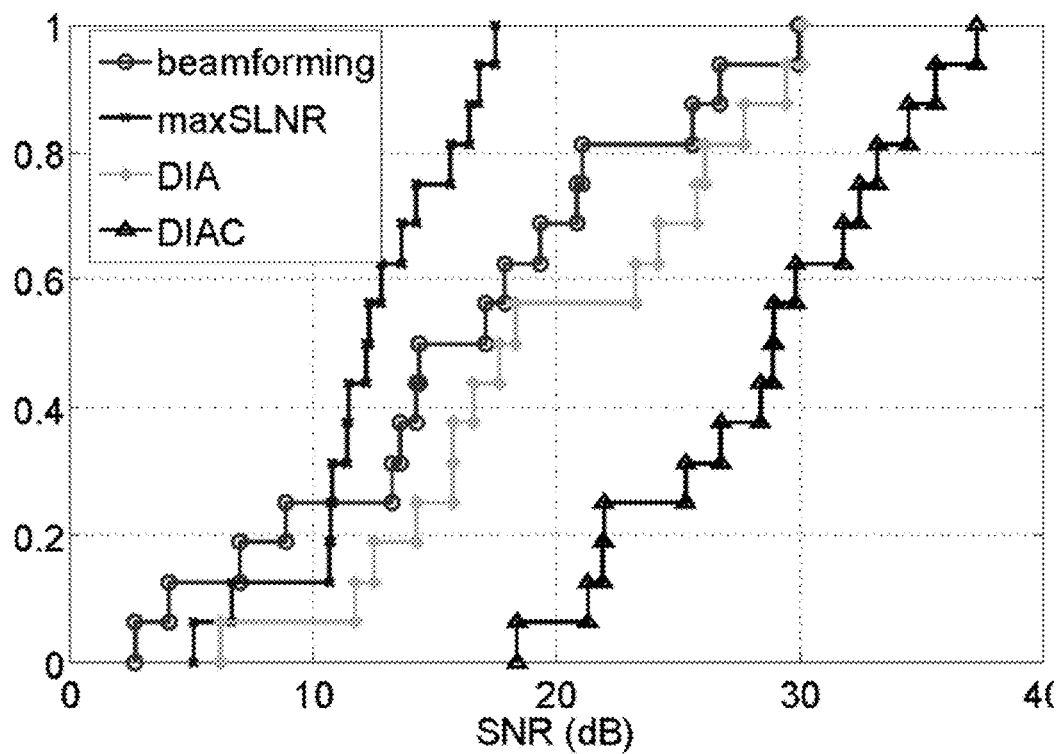
FIG. 5 depicts model based simulation results.

We first generate a line topology in which 16 APs are located on a straight line, with 30 m separation. Each AP has one client, randomly located within a circle (radius 15 m) around it. For simplicity, we define locality of coordination using hop-distance for this topology. We set the locality to 4, i.e., each link coordinates (share data and CSI) with neighbors within 4 hops. FIG. 5 shows the resulting SNR distribution of all 16 links with 2×2 antennas and single-stream transmission. In this network, each link may be interfered by many other links. Therefore, when using DIA, the 2×2 MIMO is insufficient to align all interferences to a space orthogonal to the desired signals of each link. Consequently, DIA only performs slightly better than beamforming. maxSLNR outperforms beamforming for low-SINR links that suffer from severe interference, but has lower performance for high-SINR links because it dissipates part of the power to suppressing leakage interference, instead of focusing all power towards the intended receiver. Again, by combining cancellation with alignment, DIAC outperforms all other algorithms by around 10 dB for all links.

Figure 7:
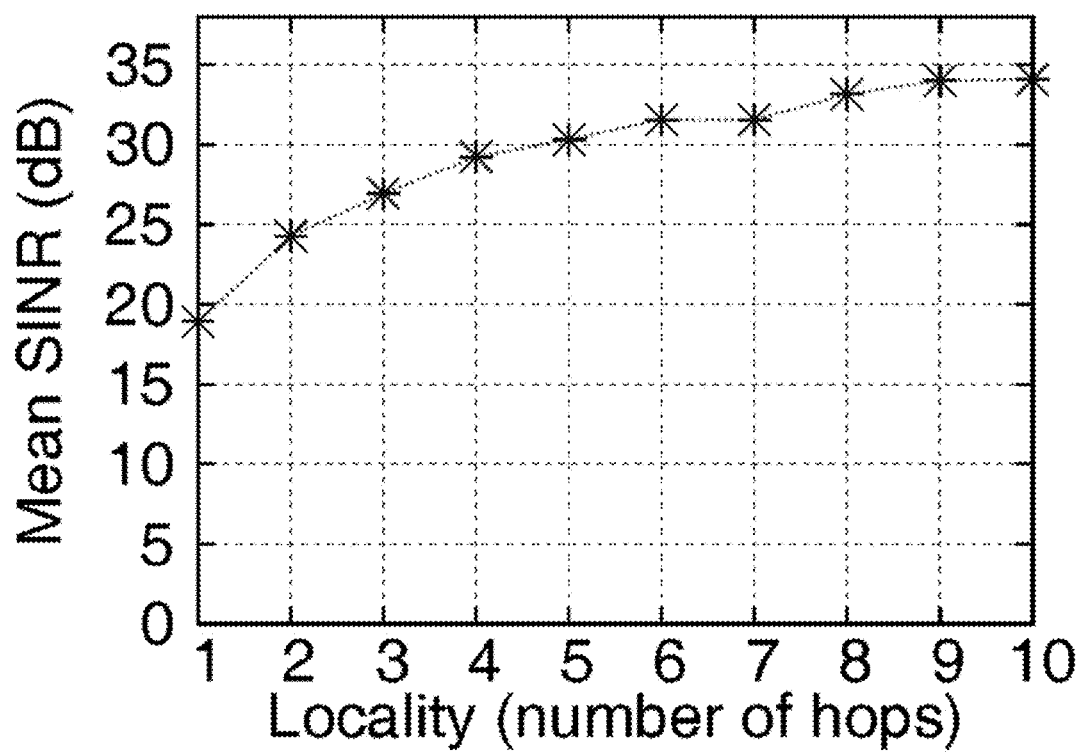
FIG. 7 depicts an effect of locality.

FIG. 7 shows the effect of locality on the mean SINR of all links when using DIAC. When locality is small, SINR increases quickly with locality. However, further improving locality to large numbers gains marginal improvement, mainly because links further away cause negligible amount of interference. Therefore, even if we localize the coordination scale to a small number of neighbors, DIAC is still able to enable concurrent transmission of all links.

Figure 8:
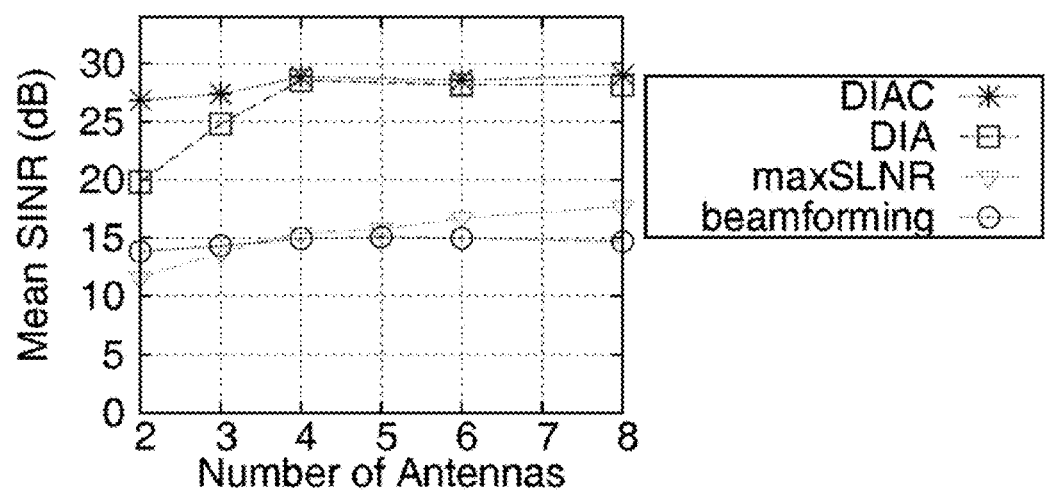
FIG. 8 depicts an effect of the number of antennas.
Figure 9:
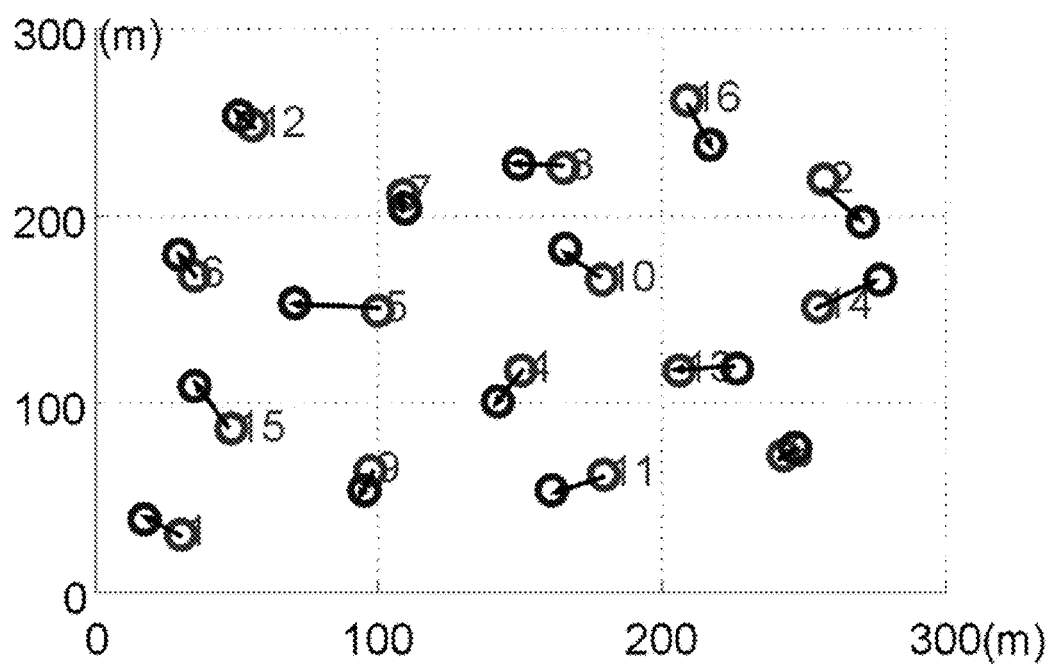
FIG. 9 depicts node locations in a random topology.

FIG. 8 shows the effect of the number of antennas on mean SINR. maxSLNR outperforms beamforming only when a large number of antennas are used to suppress interference. Both schemes have around 20 dB lower SINR than DIA and DIAC. When using a small number of antennas, DIA may have much lower SINR than DIAC, implying that interference alignment highly depends on the available antennas. By combining cancellation, DIAC is able to maintain high SINR for all links even with a small number of antennas.

Figure 10:
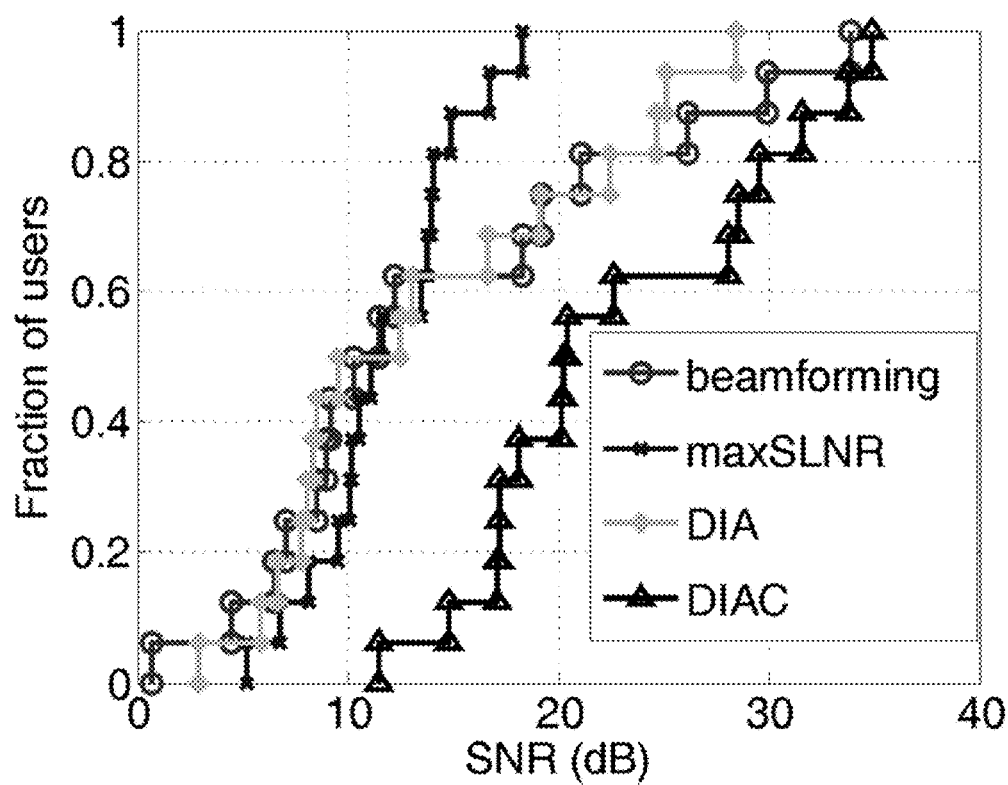
FIG. 10 depicts SNR distribution in a random topology.

We further evaluate DIAC in a random topology resembling real-world multi-cell wireless LANs. As shown in FIG. 4, the base stations are randomly generated within a 300 m×300 m field, but neighboring base stations are separated by at least 30 m. Then a client location is randomly generated within a radius of 10 m around each BS. The resulting SINR distribution is plotted in FIG. 10, where we configure locality according to $T_i = -45$ dB, $\forall i$. We observe DIA may perform even worse than beamforming, mainly because in this topology, each link suffers from a larger number of interferers than in the line topology. Whereas with DIAC, SINR is above 15 dB for most of the links, implying that DIAC is able to achieve a high level of concurrent transmissions even in real-world network topologies.

V. Conclusion

We have proposed DIAC, a distributed algorithm that improves the performance of CoMP systems by leveraging the locality of interference. DIAC integrates localized interference cancellation algorithms with distributed interference alignment, is applicable to both uplink and downlink transmissions, and only requires data/CSI sharing between close-by neighboring base stations. Both trace-driven simulation and model-driven simulation have shown DIAC to substantially improve the number of concurrent transmissions, even with a limited number of antennas.

What is claimed is:

1. In a multiple-input multiple-output (MIMO) wireless system supporting Coordinated Multi-Point (COMP) transmission and having a first base station, a second base station, and a user equipment, a communications method implemented in the first base station, the communications method comprising:

exchanging, with the second base station through local information exchange, first information about a first channel between the first base station and the user equipment and second information about a second channel between the second base station and the user equipment; and computing at least one of a precoding matrix, a receiver filter, and a projection matrix U and V and user k, streams of data d, potential interference P, link i and neighboring link j, and + is a complex conjugate operator, comprising determining:

$$U^{[i]} = \arg\min_{U^{[k]}} I^{[i]} = Tr[(U^{[k]})^\dagger Q^{[i]} U^{[k]}]$$

where $$Q^{[i]} = \sum_{j \in R(i)} \frac{P}{d} H^{[ij]} V^{[j]} (V^{[j]})^\dagger (H^{[ij]})^\dagger,$$

and wherein the method further comprises the steps of estimating, by the user equipment, the first information and the second information, and sharing the first information and the second information with the first base station.

2. The communications method as in claim 1, further comprising:

attempting to decode an uplink signal from the user equipment;

sharing the decoded signal with the second base station, if the attempt is successful; and sending a message to a coordinator, if the attempt is unsuccessful.

3. The communications method as in claim 2, wherein information about the precoding matrix is shared or before the decoded signal is shared the decoded signal is precoded.

4. The communications method as in claim 1, further comprising:

calculating a first post-scheduling Signal to Interference plus Noise Ratio (SINR) for the user equipment; and scheduling the user equipment for transmission, if the first post-scheduling SINR exceeds a first threshold.

5. The communications method as in claim 4, wherein the first threshold is different from a decodability threshold.

6. The communications method as in claim 5, wherein the decodability threshold comprises ability or possibility to decode the message.

7. The communications method as in claim 4, further comprising:
providing information about an interfering signal to the second base station.

8. The communications method as in claim 7, wherein raw data of the user equipment is shared by the first base station and the second base station.

9. The communications method as in claim 7, wherein the information comprises a signal to be transmitted from the first base station.

10. The communications method as in claim 7, wherein the provided information comprises a signal dirty-paper-coded to cancel interference before transmission.

11. The communications method as in claim 7, wherein the information comprises a signal Tomlinson-Harashima-precoded to cancel interference before transmission.

12. The communications method as in claim 4, further comprising:
recalculating, according to information about a decodable user equipment, a second post-scheduling SINR for the user equipment if the first post-scheduling SINR does not exceed a second threshold.

13. The communications method as in claim 12, wherein the second threshold is the same as the first threshold.

14. The communications method as in claim 12, further comprising:
iterating the recalculation until a predetermined number of iteration is reached or no more user equipment becomes decodable.

15. The communications method as in claim 14, wherein the first base station and the second base station substantially simultaneously transmits a downlink signal upon reception of a sync signal from a coordinator.

16. In a multiple-input multiple-output (MIMO) wireless system supporting Coordinated Multi-Point (CoMP) transmission and having a first base station, a second base station, a first user equipment, and a second user equipment, a communications method implemented in the first user equipment, the communications method comprising:
exchanging, with the second user equipment through local information exchange, first information about a first channel between the first base station and the first user equipment and second information about a second channel between the second base station and the first user equipment; and
computing at least one of a precoding matrix, a receiver filter, and a projection matrix U and V and user k, streams of data d, potential interference P, link i and neighboring link j, and + is a complex conjugate operator, comprising determining:

$$U^{[i]} = \arg\min_{U^{[k]}} I^{[i]} = Tr\big[(U^{[k]})^\dagger Q^{[i]} U^{[k]}\big]$$

where $$Q^{[i]} = \sum_{j \in R(i)} \frac{P}{d} H^{[ij]} V^{[j]} (V^{[j]})^\dagger (H^{[ij]})^\dagger,$$

and
wherein the method further comprises the steps of estimating, by the first user equipment estimates the first information and the second information, and sharing the first information and the second information with the first base station and the second base station.

17. The communications method as in claim 16,
wherein the first base station attempts to decode an uplink signal from the first user equipment,
wherein the first base station shares the decoded signal with the second base station, if the attempt is successful, and
wherein the first base station sends a message to a coordinator, if the attempt is unsuccessful.

18. The communications method as in claim 16, wherein the first base station calculates a first post-scheduling Signal to Interference plus Noise Ratio (SINR) for the user equipment, and
wherein the first base station schedules the user equipment for transmission, if the first post-scheduling SINR exceeds a first threshold.

19. A multiple-input multiple-output (MIMO) wireless system supporting Coordinated Multi-Point (CoMP) transmission, the MIMO wireless system comprising:
a first base station;
a second base station; and
a user equipment,
wherein the first base station is configured to exchange, with the second base station through local information exchange, first information about a first channel between the first base station and the user equipment and second information about a second channel between the second base station and the user equipment,
wherein the first base station is configured to compute at least one of a precoding matrix, a receiver filter, and a projection matrix U and V and user k, streams of data d, potential interference P, link i and neighboring link j, and + is a complex conjugate operator, comprising determining:

$$U^{[i]} = \arg\min_{U^{[k]}} I^{[i]} = Tr\big[(U^{[k]})^\dagger Q^{[i]} U^{[k]}\big]$$

where $$Q^{[i]} = \sum_{j \in R(i)} \frac{P}{d} H^{[ij]} V^{[j]} (V^{[j]})^\dagger (H^{[ij]})^\dagger,$$

and
wherein the user equipment is configured to estimate the first information and the second information, and to share the first information and the second information with the first base station.

20. A multiple-input multiple-output (MIMO) wireless system supporting Coordinated Multi-Point (CoMP) transmission, the MIMO wireless system comprising:
a first base station;
a second base station;
a first user equipment; and
a second user equipment,
wherein the first user equipment exchanges, with the second user equipment through local information exchange, first information about a first channel between the first base station and the first user equipment and second information about a second channel between the second base station and the first user equipment,
wherein the first user equipment computes at least one of a precoding matrix, a receiver filter, and a projection matrix U and V and user k, streams of data d, potential interference P, link i and neighboring link j, and † is a complex conjugate operator, comprising determining:

$$U^{[i]} = \arg \min_{U^{[k]}} I^{[i]} = Tr\left[(U^{[k]})^\dagger Q^{[i]} U^{[k]}\right]$$

where $$Q^{[i]} = \sum_{j \in R(i)} \frac{P}{d} H^{[ij]} V^{[j]} (V^{[j]})^\dagger (H^{[ij]})^\dagger,$$

and
wherein the first user equipment is configured to estimate the first information and the second information, and to share the first information and the second information with the first base station and the second base station.

* * * * *